United States Patent [19]

Yamamoto et al.

[11] Patent Number: 5,179,144
[45] Date of Patent: Jan. 12, 1993

[54] POLYESTER RESIN COMPOSITIONS

[75] Inventors: Naoki Yamamoto; Akira Nakata; Atsunori Koshirai; Akira Yanagase, all of Otake, Japan

[73] Assignee: Mitsubishi Rayon Co., Ltd., Tokyo, Japan

[21] Appl. No.: 797,855

[22] Filed: Nov. 26, 1991

[30] Foreign Application Priority Data

Nov. 28, 1990 [JP] Japan ................... 2-322680

[51] Int. Cl.$^5$ ................... C08K 5/15; C08L 83/04
[52] U.S. Cl. ................... 524/114; 524/504; 524/513; 525/446
[58] Field of Search ................... 524/504, 114, 513; 525/446

[56] References Cited

U.S. PATENT DOCUMENTS

| | | | |
|---|---|---|---|
| 4,172,859 | 10/1979 | Epstein | 428/402 |
| 4,742,109 | 5/1988 | Takahashi et al. | 524/504 |
| 4,775,712 | 10/1988 | Sasaki et al. | 524/504 |
| 4,918,132 | 4/1990 | Hongo et al. | 524/513 |
| 5,102,941 | 4/1992 | Yamamoto et al. | 525/446 |

FOREIGN PATENT DOCUMENTS 0393616 10/1990 European Pat. Off.
58-47419 10/1983 Japan.
2-150446 6/1990 Japan.

Primary Examiner—Paul R. Michl
Assistant Examiner—Tae H. Yoon
Attorney, Agent, or Firm—Armstrong, Westerman, Hattori, McLeland & Naughton

[57] ABSTRACT

A polyester resin composition obtained by blending 60 to 99 parts by weight of a thermoplastic polyester resin (component A), 1 to 40 parts by weight of a polyorganosiloxane graft copolymer (component B) of 0.08 to 0.6 μm in average particle size obtained by graft-polymerizing one or more kinds of vinyl monomer onto a compound rubber having such a structure that 1 to 99 wt. % of a polyorganosiloxane rubber component and 99 to 1 wt. % of a polyalkyl (meth)acrylate rubber component, the total amount of both the rubber components being 100 wt. %, have been inseparably entangled with each other, the total amount of the components A and B being 100 parts by weight, and 0.01 to 10 parts by weight of an organic silane compound having an epoxy group (component C). The polyester resing composition of the present invention is excellent in impact resistance, particularly impact strength at low temperatures, gives molded products having a good appearance, and also can be used under severer conditions and in a wider range than before.

7 Claims, No Drawings

POLYESTER RESIN COMPOSITIONS

BACKGROUND OF THE INVENTION

1. Field of the Invention

The present invention relates to a polyester resin composition which has been improved in impact resistance, particularly impact resistance at low temperatures while maintaining its mechanical properties such as strength, stiffness and the like, and also which gives molded products having excellent appearance.

2. Description of the Related Art

Hitherto, there have been proposed many methods for improving the mechanical properties (e.g. impact resistance) of thermoplastic polyester resins. Among these, a method of blending a polyester and an α-olefin/glycidyl methacrylate/vinyl acetate copolymer, described in Japanese Patent Application Kokoku No. 58-47419 and U.S. Pat. No. 4,172,859, is a relatively excellent method. Also, the present applicants disclosed a method of adding a polyorganosiloxane graft copolymer to a polyester in Japanese Patent Application Kokai No. 2-150446. These methods are both relatively good, but their improvement in impact strength is still insufficient. Further, the present applicants proposed a method of adding a particular polyorganosiloxane rubber and a particular organic silane compound to a polyester in EP-A2-393,616. This method is in a satisfactory level in terms of development of impact strength, but there still remains a problem that the appearance of molded products obtained therefrom is poor.

SUMMARY OF THE INVENTION

In view of the situation mentioned above, the present inventors have extensively studied to obtain a polyester resin in which the impact resistance of a thermoplastic polyester resin has been improved over a wider range of temperature, and besides which gives molded products having excellent appearance. As a result, the present inventors have found that by blending a thermoplastic polyester resin with a polyorganosiloxane graft copolymer obtained by graft-polymerizing a vinyl monomer onto a compound rubber comprising a polyorganosiloxane rubber and a polyalkyl (meth)acrylate rubber and an organic silane compound containing an epoxy group, a resin composition having an improved impact resistance over a wide temperature range and also giving molded products having excellent appearance, can be obtained. The present inventors thus achieved the present invention.

The present invention comprises a polyester resin composition obtained by blending 99 to 60 parts by weight of a thermoplastic polyester resin (component A), 1 to 40 parts by weight of a polyorganosiloxane graft copolymer (component B) of 0.08 to 0.6 μm in average particle size obtained by graft-polymerizing one or more kinds of vinyl monomer onto a compound rubber having such a structure that 1 to 99 wt. % of a polyorganosiloxane rubber component and 99 to 1 wt. % of a polyalkyl (meth)acrylate rubber component, the total amount of both the rubber components being 100 wt. %, have been inseparably entangled with each other, the total amount of the components A and B being 100 parts by weight, and 0.01 to 10 parts by weight of an organic silane compound having an epoxy group (component C).

The polyester resin composition of the present invention is excellent in impact resistance, particularly impact strength at low temperatures, gives molded products having a good appearance, and also can be used under severer conditions and in a wider range than before.

To this polyester resin composition may be added if necessary a reinforcing filler (component D) as an additional component in amounts of 10 to 300 wt. % based on the total amount of the components A, B and C.

DESCRIPTION OF THE PREFERRED EMBODIMENTS

The thermoplastic polyester resin (A) used in the present invention refers to one comprising, as a main constituent, (a) an aromatic polyester formed from an aromatic dicarboxylic acid, a dihydric phenol and a lower aliphatic diol or alicyclic diol, (b) an aromatic polyester formed from an aromatic hydroxycarboxylic acid or (c) a copolymer of the above-mentioned (a) and (b).

The aromatic dicarboxylic acid used in the present invention is represented by the formula,

wherein $R^1$ represents a substituted or unsubstituted phenylene group, a group represented by the formula,

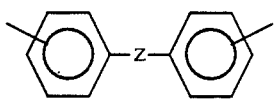

(in which Z represents a direct bond, —CH$_2$— or —CO—) or a naphthylene group. The substituent of the phenylene group includes for example chlorine, bromine, a methyl group and the like, and the phenylene group may be substituted with one to four of these substituents. Examples of this aromatic dicarboxylic acid include for example terephthalic acid, isophthalic acid, biphenyl-3,3'-dicarboxylic acid, biphenyl-4,4'-dicarboxylic acid, diphenylmethane-m,m'-dicarboxylic acid, diphenylmethane-p,p'-dicarboxylic acid, benzophenone-4,4'-dicarboxylic acid, naphthalenedicarboxylic acid and the like. These aromatic dicarboxylic acids may be used alone or in mixture of two or more of them. Further, a small amount of an aliphatic dicarboxylic acid such as adipic acid, sebacic acid or the like may be used together.

The dihydric phenol includes for example hydroquinone, resorcinol, dihydroxynaphthalene, biphenyldiol, 1,8-dihydroxyanthraquinone and a dihydric phenol represented by the formula,

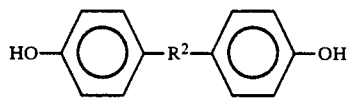

wherein $R^2$ represents an oxygen atom, a sulfur atom, CO, SO$_2$ or an alkylene group having 5 or less carbon atoms which may be substituted with a halogen.

This dihydric phenol includes for example 2,2-bis(4-hydroxphenyl)-propane (bisphenol A), 4,4'-dihydroxydiphenyl sulfone, 4,4'-dihydroxydiphenyl ether, 4,4'-dihydroxydiphenyl sulfide, 4,4'-dihydroxydiphenyl ketone, 4,4'-dihydroxydiphenylmethane, 1,1-bis(4-hydroxyphenyl)ethane, 1,1-bis(4-hydroxyphenyl)butane, 1,1-bis(4-hydroxyphenyl)-2,2,2-trichloroethane and the like. These dihydric phenols may be used alone or in mixture of two or more of them.

The lower aliphatic diol refers to an alkylenediol having 2 to 6 carbon atoms. Its examples include ethylene glycol, propylene glycol, 1,4-butanediol, 1,5-pentanediol, 1,6-hexanediol and the like. The alicyclic diol includes cyclohexanediol, cyclohexanedimethanol and the like. These diols may be used alone or in mixture of two or more of them.

The aromatic hydroxycarboxylic acid used in the present invention is represented by the formula,

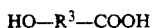

wherein $R^3$ represents a phenylene group, a group represented by the formula,

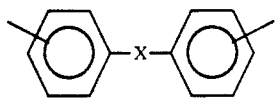

(in which X represents a direct bond, an oxygen atom or an alkylene group having 5 or less carbon atoms) or a naphthylene group.

Examples of such the aromatic hydroxycarboxylic acid include m-hydroxybenzoic acid, p-hydroxybenzoic acid, 2-hydroxy-6-naphthoic acid, 2-(4-hydroxyphenyl)-2-(4'-carboxyphenyl)propane, 4-hydroxyphenyl-4'-carboxyphenyl ether and the like. These aromatic hydroxycarboxylic acids may be used alone or in mixture of two or more of them.

Among thermoplastic polyesters obtained from these dicarboxylic acids, diols and hydroxycarboxylic acids, particularly polyethylene terephthalate, polybutylene terephthalate and poly(1,4-cyclohexylene-dimethylene terephthalate) clearly exhibit the effect of the present invention.

The polyorganosiloxane graft copolymer (B) used in the present invention refers to a graft copolymer [hereinafter referred to as graft copolymer (B)] obtained by graft-polymerizing one or more kinds of vinyl monomer onto a compound rubber composed of 1 to 99 wt. % of a polyorganosiloxane rubber component and 99 to 1 wt. % of a polyalkyl (meth)acrylate rubber component, the total amount of both the rubber components being 100 wt. %, and having such a structure that both the rubber components have been entangled with each other and are substantially inseparable from each other.

If either one of the polyorganosiloxane rubber component or polyalkyl (meth)acrylate rubber component, or a simple mixture of the both is used as a rubber source in place of the above compound rubber, the resin composition of the present invention is not obtained. Resin compositions giving excellent impact resistance and molded products having excellent surface appearance can be obtained only by using the compound rubber in which the polyorganosiloxane rubber component and the polyalkyl (meth)acrylate rubber component have been entangled and united with each other.

When the amount of the polyorganosiloxane rubber component constituting the compound rubber exceeds 99 wt. %, the resin composition obtained gives molded products having a bad surface appearance. When the amount of the polyalkyl (meth)acrylate rubber component exceeds 99 wt. %, the resin composition obtained gives molded products having a bad impact resistance. Because of this, the amount of any one of the rubber components constituting the compound rubber needs to be 1 to 99 wt. %, provided that the total amount of the rubber components is 100 wt. %. More preferably, the amount is in a range of 10 to 90 wt. %. Further, it is desirable that the average particle size of the compound rubber is in a range of 0.08 to 0.6 μm.

For producing the compound rubber having such an average particle size, the emulsion polymerization method is most suitable. Firstly, the latex of the polyorganosiloxane rubber is prepared, and then materials for synthesizing the alkyl (meth)acrylate rubber are polymerized in the presence of the polyorganosiloxane rubber. That is, it is desirable to swell the polyorganosiloxane rubber particles with the materials for synthesizing the alkyl (meth)acrylate rubber and then polymerize the materials.

The polyorganosiloxane rubber component constituting the compound rubber can be prepared by emulsion-polymerizing the following organosiloxane and crosslinking agent for the polyorganosiloxane rubber [hereinafter referred to as crosslinking agent (I)]. In this case, a graft-linking agent for the polyorganosiloxane rubber [hereinafter referred to as graft-linking agent (I)] may be used together.

As the organosiloxane, there are given various three or more-membered cyclic organosiloxanes, among which three to six-membered ones are preferably used. Examples of such the cyclic organosiloxane include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane and the like. These cyclic organosiloxanes may be used alone or in mixture of two or more of them. The amount of these cyclic organosiloxanes used is preferably 50 wt. % or more, more preferably 70 wt. % or more of the polyorganosiloxane rubber component.

As the crosslinking agent (I), trialkoxysilanes or tetraalkoxysilanes are used. Specific examples of these tri- or tetraalkoxysilanes include triethoxyphenylsilane, tetramethoxysilane, tetraethoxysilane, tetra-n-propoxysilane, tetrabutoxysilane and the like. Among these, tetraalkoxysilanes are preferred, and tetraethoxysilane is particularly preferred. The amount of the cross-linking agnet (I) used is 0.1 to 30 wt. % of the polyorganosiloxane rubber component.

The graft-linking agent (I) refers to a monomer having both of the following functional groups, one of them being a functional group which acts to incorporate the agent (I) polymerized together at the step of preparation of the polyorganosiloxane rubber by polymerization into the structure of the resulting rubber, i.e. an alkoxy group attached to a silicon atom, and the other of them being a functional group which does not react at the above step, but reacts at the subsequent step in which the polyalkyl (meth)acrylate rubber is prepared by polymerization in the presence of the polyorganosiloxane rubber, to form a graft bond between the polyalkyl (meth)acrylate rubber and the polyorganosiloxane rubber, there being given for example a C=C unsaturated bond, a mercapto group and the like.

As such the graft-linking agent (I), compounds which can form an organosiloxane unit represented by either one of the formulae (I), (II), (III) and (IV) are used:

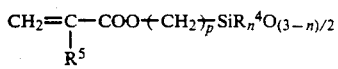 (I)

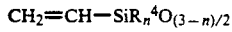 (II)

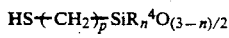 (III)

or

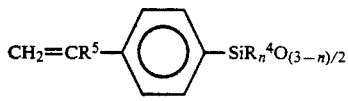 (IV)

wherein $R^4$ represents a methyl, ethyl, propyl or phenyl group, $R^5$ represents a hydrogen atom or a methyl group, n represents an integer of 0, 1 or 2, and p represents an integer of 1 to 6. (Meth)acryloyloxysiloxane which can form the unit of the formula (I) has a high grafting efficiency which makes it possible to form effective graft chains, so that it is advantageous in terms of development of impact resistance. Of those which can form the unit of the formula (I), methacryloyloxysiloxane is particularly preferred. Specific examples thereof include β-methacryloyloxyethyldimethoxymethylsilane γ-methacryloyloxypropylmethoxydimethylsilane, γ-methacryloyloxyproplydimethoxymethylsilane, γ-methacryloyloxypropyltrimethoxysilane, γ-methacryloyloxypropylethoxydiethylsilane, γ-methacryloyloxypropyldiethoxymethylsilane, δ-methacryloyloxybutyldiethoxymeyhylsilane and the like. The amount of the graft-linking agent (I) used is 0 to 10 wt. % of the polyorganosiloxane rubber component.

For preparing the polyorganosiloxane rubber component by polymerization, methods described, for example, in U.S. Pat. Nos. 2,891,920, 3,294,725, etc. can be used.

In the present invention, it is preferred to produce the polyorganosiloxane rubber, for example, by the method in which a mixed solution of organosiloxane, the graft-linking agent (I) and the crosslinking agent (I) is shear-mixed with water using, for example, a homogenizer in the presence of a sulfonic acid emulsifier such as an alkylbenzenesulfonic acid, an alkylsulfonic acid or the like. The alkylbenzenesulfonic acid is desirable because it acts as an emulsifier for organosiloxane and at the same time acts as a polymerization initiator. In this case, it is preferred to use the metal salt of the alkylbenzenesulfonic acid or alkylsulfonic acid together with the above sulfonic acid because the metal salt has an effect to keep the polymer stable during the graft polymerization.

The polyalkyl (meth)acrylate rubber component constituting the compound rubber can be synthesized using the following alkyl (meth)acrylate, crosslinking agent for the polyalkyl (meth)acrylate rubber [(hereinafter referred to as crosslinking agent (II)] and graft-linking agent for the same [hereinafter referred to as graft-linking agent (II)].

The alkyl (meth)acrylate includes alkyl acrylates (e.g. methyl acrylate, ethyl acrylate, n-propyl acrylate, n-butyl acrylate, 2-ethylhexyl acrylate) and alkyl methacrylates (e.g. hexyl methacrylate, 2-ethylhexyl methacrylate, n-lauryl methacrylate). Particularly, n-butyl acrylate is preferred.

As the crosslinking agent (II), there are given for example ethylene glycol dimethacrylate, propylene glycol dimethacrylate, 1,3-butylene glycol dimethacrylate, 1,4-butylene glycol dimethacrylate and the like.

The graft-linking agent (II) refers to a monomer having both of the following functional groups, one of them being a functional group which acts to incorporate the agent (II) polymerized together at the step of preparation of the polyalkyl (meth)acrylate rubber by polymerization into the structure of the resulting rubber, and the other of them being a functional group which remains unreacted at the above step, but reacts at the subsequent step in which the vinyl monomer is polymerized in the presence of the compound rubber, to form a graft chain to the compound rubber. In other words, the graft-linking agent (II) refers to a monomer having a plural number of polymerizable functional groups different in reactivity.

Such the graft-linking agent (II) include for example allyl methacrylate, triallyl cyanurate, triallyl isocyanurate and the like. Allyl methacrylate can also be used as the crosslinking agent (II). Any of these crosslinking agent (II) and graft-linking agent (II) is used alone or in mixture of two or more of them. The amount of any one of these crosslinking agnet (II) and graft-linking agent (II) used is 0.1 to 10 wt. % of the polyalkyl (meth)acrylate rubber component. When allyl methacrylate is used as both the crosslinking agent (II) and the graft-linking agent (II), it will suffice to use it in an amount of 0.2 to 20 wt. %.

For preparing the polyalkyl (meth)acrylate rubber component by polymerization, the above alkyl (meth)acrylate, crosslinking agent (II) and graft-linking agent (II) are added to the latex of the polyorganosiloxane rubber component previously neutralized by adding the aqueous solution of an alkali (e.g. sodium hydroxide, potassium hydroxide, sodium carbonate), thereby swelling the polyorganosiloxane rubber particles with these components and then these components are polymerized by the action of a common radical polymerization initiator. With the progress of the polymerization, the crosslinked network of the polyalkyl (meth)acrylate rubber entangled with that of the polyorganosiloxane rubber is formed at the interface of both the rubbers. Thus, a compound rubber particle comprising the polyorganosiloxane rubber component and the polyalkyl (meth)acrylate rubber component which are substantially inseparable from each other, is obtained.

The compound rubber thus produced by emulsion polymerization can be graft-copolymerized with a vinyl monomer. Also, the polyorganosiloxane rubber component and the polyalkyl (meth)acrylate rubber component have been strongly entangled with each other, so that they cannot be extracted to separate from each other with usual organic solvents such as acetone, toluene and the like. On extracting this compound rubber with toluene at 100° C. for 12 hours, its gel content is 80 wt. % or more.

As the vinyl monomer to be graft-polymerized onto this compound rubber, there are given various vinyl monomers such as aromatic vinyl compounds (e.g. styrene, α-methylstyrene), (meth)acrylates (e.g. methyl methacrylate, 2-ethylhexyl methacrylate, methyl acrylate, ethyl acrylate, butyl acrylate), vinyl cyanide compounds (e.g. acrylonitrile, methacrylonitrile) and the like. These monomers are used alone or in combination of two or more of them. Of these vinyl monomers, (meth)acrylates are preferred, and methyl methacrylate is particularly preferred.

Referring to the proportion of the above vinyl monomer and compound rubber, the compound rubber is preferably 30 to 95 wt. % based on the weight of the graft copolymer (B), and the vinyl monomer is preferably 5 to 70 wt. % based on the same. More preferably, the compound rubber is 70 to 95 wt. %, and the vinyl monomer is 5 to 30 wt. %. When the proportion of the vinyl monomer is less than 5 wt. %, the dispersion of the graft copolymer (B) in the resin composition is not sufficient, and when it exceeds 70 wt. %, the development of impact strength lowers, so that such the proportions are not preferred.

The latex of the graft copolymer (B) can be obtained by one-stage or multi-stage polymerization of the above vinyl monomer by the radical polymerization technique. The average particle size of the graft copolymer (B) particle in the latex needs to be in a range of 0.08 to 0.6 μm. When the average particle size is less than 0.08 μm, the resin composition obtained gives molded products having a poor impact resistance, and when it exceeds 0.6 μm, the surface appearance of the molded products becomes poor.

From the latex of the graft copolymer (B) thus obtained can be separated and recovered the graft copolymer (B) by pouring the latex into a hot water in which a metal salt (e.g. calcium chloride, magnesium sulfate) has been dissolved, to salt-out and coagulate the graft copolymer (B).

The organic silane compound having an epoxy group (C) used in the present invention refers to a mixture of one or more compounds represented by the formula (V),

wherein m represents an integer of 1 to 3, $R^6$ represents a direct bond or an alkylene group having 1 to 3 carbon atoms, $R^7$ represents a methyl or ethyl group, and Y and Z are groups represented below,

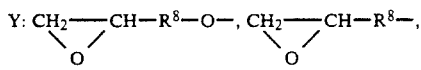

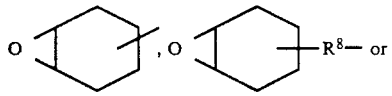

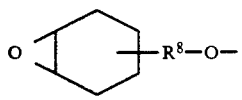

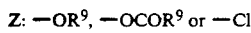

(in which $R^8$ represents an alkylene group having 1 to 3 carbon atoms, and $R^9$ represents a methyl or ethyl group).

As specific examples of these organic silane compounds having an epoxy group, there are given γ-glycidoxypropyltrimethoxysilane, γ-gylcidoxypropylmethyldiethoxysilane, β-(3,4-epoxycyclohexyl)ethyltrimethoxysilane and the like.

The polyester resin composition of the present invention is obtained by blending 60 to 99 parts by weight of the thermoplastic polyester resin (component A), 1 to 40 parts by weight of the graft copolymer (component B), the total amount of the components A and B being 100 parts by weight, and 0.01 to 10 parts by weight of the organic silane compound having an epoxy group (component C). When the amount of the component B blended is less than 1 part by weight, development of the impact strength tends to become insufficient, and when it exceeds 40 parts by weight, the heat resistance tends to lower, so that such the amounts are not preferred. Further, when the amount of the component C based on 100 parts by weight of the total amount of the components A and B is less than 0.01 part by weight, development of the impact strength tends to become insufficient, and when it exceeds 10 parts by weight, the flowability is adversely affected, so that such the amounts are not preferred.

If desired, into the polyester resin composition of the present invention may be incorporated a reinforcing filler (component D) in an amount of 10 to 300 wt. % based on the total amount of the components A, B and C. The reinforcing filler includes fibrous reinforcing fillers such as glass fibers, carbon fibers, potassium titanate, asbestos, silicon carbide, ceramics fibers, metal fibers, silicon nitride, aramide fibers, etc.; and granular reinforcing fillers such as barium sulfate, calcium sulfate, kaolin, clay, pyrophyllite, bentonite, sericite, zeolite, mica, nepheline syenite, talc, attapulgite, wollastonite, PMF, ferrite, calcium silicate, calcium carbonate, magnesium carbonate, dolomite, antimony trioxide, zinc oxide, titanium oxide, magnesium oxide, iron oxide, molybdenum disulfide, graphite, gypsum, glass beads, glass balloons, quartz powders, etc. By incorporating the reinforcing fillers, the mechanical strength can further be improved. When these reinforcing fillers are blended, known silane coupling agents can be used.

If necessary, into the polyester resin composition of the present invention may further be incorporated dyes, pigments, stabilizers to light and heat, known flame retardants (e.g. brominated epoxy, brominated polycarbonate, decabromodiphenyl ether, antimony oxide), crystal-nucleating agents, various modifiers, mold-release agents (e.g. waxes) and the like.

The present invention will be illustrated specifically with reference to the following examples. In the examples, all parts are by weight.

Various physical properties in the examples and comparative examples were measured by the following methods. Izod impact strength:

According to the method described in ASTM D 256 ⅛" in thickness, notched. Appearance:

Evaluated by visual assessment.

○: Good

×: Pearly luster is present or surface smoothness is bad.

REFERENTIAL EXAMPLE 1

Preparation of graft copolymer S-1

Two parts of tetraethoxysilane, 0.5 part of γ-methacryloyloxypropyldimethoxymethylsilane and 97.5 parts of octamethylcyclotetrasiloxane were mixed to obtain 100 parts of a siloxane mixture. One part of sodium dodecylbenzenesulfonate and 1 part of dodecylbenzenesulfonic acid were dissolved in 200 parts of distilled water, and the resulting solution was added to 100 parts of the above siloxane mixture. The resulting mixture was preliminarily stirred at 10,000 rpm with a homomixer and then emulsified and dispersed with a homogenizer under a pressure of 300 kg/cm$^2$ to obtain an organosiloxane latex. This mixed solution was transferred to a separable flask equipped with a condenser and a stirring blade, and heated at 80° C. for 5 hours with stirring and mixing and then allowed to stand at 20° C. for 48 hours. Thereafter, this latex was neutralized to a pH of 7.0 with an aqueous sodium hydroxide solution to complete polymerization. Thus, a polyorganosiloxane rubber latex was obtained (hereinafter referred to as PDMS-1). The conversion of the siloxane mixture to the polyorganosiloxane rubber was 89.7%, and the number average particle size of the polyorganosiloxane rubber was 0.16 μm.

Thirty three parts of this PDMS-1 was sampled and put in a separable flask equipped with a stirrer. After 267 parts of distilled water was added thereto and the atmosphere of the flask was replaced by nitrogen, the contents of the flask were heated to 50° C. At this temperature, a mixed solution of 80 parts of n-butyl acrylate, 1.6 parts of allyl methacrylate and 0.192 part of tert-butylhydroperoxide was added to allow this mixed solution to soak into the polyorganosiloxane rubber particles. Thereafter, a mixed solution of 0.001 part of ferrous sulfate, 0.003 part of disodium ethylenediaminetetraacetate, 0.24 part of Rongalite and 10 parts of distilled water was added, and radical polymerization was carried out at an inner temperature of 70° C. for 2 hours to complete the polymerization. Thus, the polyorganosiloxane compound rubber latex was obtained.

To this compound rubber latex was added a mixed solution of 10 parts of methyl methacrylate and 0.024 part of tert-butylhydroperoxide, and graft polymerization onto the compound rubber was carried out while maintaining the inner temperature at 70° C. for 4 hours. The conversion of methyl methacrylate was 97.5%, and the average particle size of the graft copolymer latex was 0.20 μm. This latex was dropwise added to 600 parts of hot water containing 1.5 wt. % of calcium chloride, and the coagulated product obtained was separated, repeatedly washed with water and dried at 80° C. for 24 hours to obtain 97.7 parts of the dry powder of S-1.

REFERENTIAL EXAMPLES 2 to 7

Preparation of Graft Copolymers S-2 to S-7

Graft copolymers S-2 to S-7 were produced in the same manner as in Referential Example 1 except that the conditions were changed as shown in Table 1. The physical properties of these graft copolymers are shown together in Table 1.

REFERENTIAL EXAMPLE 8

Preparation of Graft Copolymer S-8

Two hundreds parts of distilled water and 1 part of sodium dodecylbenzenesulfonate were added to a separable flask equipped with a stirrer. After the atmosphere of the flask was replaced by nitrogen, 88.2 parts of n-butyl acrylate, 1.8 parts of allyl methacrylate and 0.2 part of tert-butylhydroperoxide were added. Thereafter, the contents of the flask was heated to 50° C., and at this temperature, a mixed solution of 0.001 part of ferrous sulfate, 0.003 part of disodium ethylenediaminetetraacetate, 0.24 part of Rongalite and 10 parts of distilled water was added, and radical polymerization was carried out at an inner temperature of 70° C. for 1 hour. Thereafter, a mixed solution of 10 parts of methyl methacrylate and 0.24 part of tert-butylhydroperoxide was added thereto, and the inner temperature was kept at 70° C. for 3 hours to complete the polymerization. Coagulation and drying were carried out in the same manner as in Referential Example 1 to obtain 97.9 parts of a graft copolymer dry powder (S-8). The average particle size of the latex was 0.18 μm, and the conversion of methyl methacrylate was 98.1%.

TABLE 1

| Referential Example No. | 2 | 3 | 4 | 5 | 6 | 7 |
| --- | --- | --- | --- | --- | --- | --- |
| Polyorganosiloxane rubber latex (part) | 100 | 150 | 200 | 267 | 133 | 117 |
| Distilled water (part) | 220 | 185 | 150 | 103 | 197 | 208 |
| n-Butyl acrylate (part) | 60 | 45 | 30 | 10 | 40 | 35 |
| Allyl methyacrylate (part) | 1.2 | 0.9 | 0.6 | 0.2 | 0.8 | 0.7 |
| Methyl methacrylate (part) | 10 | 10 | 10 | 10 | 20 | 30 |
| Conversion of methyl methacrylate (%) | 97.8 | 98.3 | 97.1 | 96.9 | 98.0 | 98.1 |
| Average particle size of the graft copolymer latex (μm) | 0.20 | 0.19 | 0.18 | 0.18 | 0.19 | 0.19 |
| Yield of the graft copolymer dry powder (part) | 96.3 | 97.4 | 96.9 | 97.1 | 96.5 | 97.2 |

REFERENTIAL EXAMPLE 9

One hundred and ninety four parts of dimethyl terephthalate, 288 parts of 1,4-cyclohexanedimethanol and 0.1 part of tetrabutoxytitanium were charged into a stainless steel reactor, and heated to 200° C. with stirring. After methanol was completely distilled out of the reactor, the temperature was raised to 270° C., and the pressure in the reactor was reduced to 1 mmHg. After further raising the temperature to 300° C. in 1 hour, the pressure was returned to normal pressure with nitrogen to obtain polycyclohexyldimethylene terephthalate (PCT). The melting point of the resulting polymer was 290° to 300° C., and the intrinsic viscosity thereof was 0.8.

EXAMPLES 1 to 17

Using as a thermoplastic polyester resin, polybutylene terephthalate (trade name, Tufpet PBTN-1000; produced by Mitsubishi Rayon Co., Ltd.), polyethylene terephthalate (trade name, Dianite PA-210; produced by Mitsubishi Rayon Co., Ltd.) and polycyclohexyldimethylene terephthalate obtained in Referential Example 9, the above thermoplastic polyester resins, the polyorganosiloxane graft copolymers S-1 to S-7 obtained in Referential Examples 1 to 7 and organic silane compounds were blended in proportions shown in Table 3. Each blend was pelletized on a twin-screw extruder (TEM-35B produced by Toshiba Machine Co., Ltd.) at a cylinder temperature of 240° C. The pellets obtained were dried and molded into test pieces on an injection molding machine (Promat injection molding machine produced by Sumitomo Heavy Industries, Ltd.) at a cylinder temperature of 240° C. and a mold temperature of 80° C. Impact resistance was then evaluated using the test pieces. The results are shown in Table 2.

Comparative Example 4, the polyorganosiloxane rubber latex obtained in the course of Referential Example 1 was coagulated as it was, dried and used. In Comparative Example 9, an ethylene/glycidyl methacrylate copolymer (Bondfast E produced by Sumitomo Chemical Co., Ltd.) was used as the rubber.

EXAMPLES 18 to 26 AND COMPARATIVE

TABLE 2

| Example No. | | 1 | 2 | 3 | 4 | 5 | 6 | 7 |
|---|---|---|---|---|---|---|---|---|
| Graft copolymer (B) | Kind | S-1 | S-2 | S-3 | S-4 | S-5 | S-6 | S-7 |
| | Amount (part) | 20 | 20 | 20 | 20 | 20 | 20 | 20 |
| Polyester | Kind | PBT | PBT | PBT | PBT | PBT | PBT | PBT |
| | Amount (part) | 80 | 80 | 80 | 80 | 80 | 80 | 80 |
| Organic silane | Kind | (a) | (a) | (a) | (a) | (a) | (a) | (a) |
| compound | Amount (part) | 1 | 1 | 1 | 1 | 1 | 1 | 1 |
| Izod impact strength ($\frac{1}{8}''$ in thickness, notched), (kg · cm/cm) | | | | | | | | |
| 23° C. | | 106 | 101 | 99 | 86 | 85 | 85 | 85 |
| −20° C. | | 100 | 97 | 95 | 81 | 80 | 80 | 79 |
| Appearance | | ○ | ○ | ○ | ○ | ○ | ○ | ○ |

| Example No. | | 8 | 9 | 10 | 11 | 12 | 13 | 14 | 15 | 16 | 17 |
|---|---|---|---|---|---|---|---|---|---|---|---|
| Graft copolymer (B) | Kind | S-1 | S-1 | S-1 | S-1 | S-1 | S-1 | S-1 | S-1 | S-1 | S-1 |
| | Amount (part) | 5 | 10 | 30 | 20 | 20 | 20 | 20 | 20 | 20 | 20 |
| Polyester | Kind | PBT | PBT | PBT | PBT | PBT | PBT | PBT | PBT | PET | PCT |
| | Amount (part) | 90 | 90 | 70 | 80 | 80 | 80 | 80 | 80 | 80 | 80 |
| Organic silane | Kind | (a) | (a) | (a) | (a) | (a) | (a) | (b) | (c) | (a) | (a) |
| compound | Amount (part) | 1 | 1 | 1 | 0.5 | 2 | 5 | 1 | 1 | 1 | 1 |
| Izod impact strength ($\frac{1}{8}''$ in thickness, notched), (kg · cm/cm) | | | | | | | | | | | |
| 23° C. | | 35 | 50 | 110 | 90 | 107 | 107 | 105 | 103 | 65 | 50 |
| −20° C. | | 30 | 44 | 102 | 85 | 100 | 100 | 99 | 98 | 50 | 39 |
| Appearance | | ○ | ○ | ○ | ○ | ○ | ○ | ○ | ○ | ○ | ○ |

Note:
PBT: Polybutylene terephthalate
PET: Polyethylene terephthalate
PCT: Polycyclohexyldimethylene terephthalate
(a): γ-Glycidoxypropyltrimethoxysilane ("KBM 403" produced by Shin-Etsu Chemical Co., Ltd.)
(b): γ-Glycidoxypropylmethyldiethoxysilane ("KBE 402" produced by Shin-Etsu Chemical Co., Ltd.)
(c): β-(3,4-epoxycyclohexyl)ethyltrimethoxysilane ("KBM 303" produced by Shin-Etsu Chemical Co., Ltd.)

TABLE 3

| Comparative Example No. | | 1 | 2 | 3 | 4 | 5 | 6 | 7 | 8 | 9 | 10 |
|---|---|---|---|---|---|---|---|---|---|---|---|
| Graft copolymer (B) | Kind | — | S-1 | — | PDMS-1 | S-1 | S-1 | — | — | Ethylene/glycidyl methacrylate copolymer, 20 | S-8 |
| | Amount (part) | — | 20 | — | 20 | 20 | 20 | — | — | | 20 |
| Polyester | Kind | PBT | PBT | PBT | PBT | PBT | PBT | PET | PCT | PBT | PBT |
| | Amount (part) | 100 | 80 | 100 | 80 | 80 | 80 | 100 | 100 | 80 | 80 |
| Organic silane | Kind | — | — | (a) | (a) | (a) | (d) | (e) | — | — | (a) |
| Compound | Amount (part) | — | — | 1 | 1 | 1 | 1 | — | — | — | 1 |
| Izod impact strength ($\frac{1}{8}''$ in thickness, notched) (kg · cm/cm) | | | | | | | | | | | |
| 23° C. | | 4 | 37 | 5 | 27 | 35 | 33 | 3 | 3 | 84 | 34 |
| −20° C. | | 3 | 25 | 3 | 22 | 27 | 25 | 2 | 2 | 42 | 21 |
| Appearance | | ○ | ○ | ○ | x | ○ | ○ | ○ | ○ | ○ | ○ |

Note:
(a): γ-Glycidoxypropyltrimethoxysilane ("KBM 403" produced by Shin-Etsu Chemical Co., Ltd.)
(d): γ-Mercaptopropyltrimethoxysilane ("KBM 803" produced by Shin-Etsu Chemical Co., Ltd.)
(e): β-Aminopropyltrimethoxysilane ("KBE 903" produced by Shin-Etsu Chemical Co., Ltd.)

COMPARATIVE EXAMPLES 1 to 10

For comparison, using compositions blended as shown in Table 3, test pieces for evaluation were prepared in the same manner as in Example 1 and evaluated. The results are shown together in Table 3. In

EXAMPLES 11 to 20

Test pieces for evaluation having compositions shown in Tables 4 and 5 were prepared in the same manner as in Example 1 and evaluated. The results are shown together in Tables 4 and 5.

TABLE 4

| Example No. | | 18 | 19 | 20 | 21 | 22 | 23 | 24 | 25 | 26 |
|---|---|---|---|---|---|---|---|---|---|---|
| Graft copolymer (B) | Kind | S-1 | S-1 | S-1 | S-1 | S-1 | S-1 | S-1 | S-1 | S-1 |
| | Amount (part) | 20 | 20 | 20 | 20 | 20 | 20 | 20 | 20 | 20 |
| Polyester | Kind | PBT | PBT | PBT | PBT | PBT | PBT | PBT | PET | PCT |
| | Amount (part) | 80 | 80 | 80 | 80 | 80 | 80 | 80 | 80 | 80 |
| Organic silane compound | Kind | (a) | (a) | (a) | (a) | (a) | (b) | (c) | (a) | (a) |
| | Amount (part) | 1 | 1 | 1 | 1 | 1 | 1 | 1 | 1 | 1 |
| Reinforcing filler | Kind | GF | GF | GF | CF | Talc | GF | GF | GF | GF |
| | Amount (part) | 43 | 25 | 67 | 43 | 43 | 43 | 43 | 43 | 43 |

TABLE 4-continued

| Example No. | 18 | 19 | 20 | 21 | 22 | 23 | 24 | 25 | 26 |
|---|---|---|---|---|---|---|---|---|---|
| Izod impact strength (⅛" in thickness, notched) (kg · cm/cm) | | | | | | | | | |
| 23° C. | 33 | 29 | 32 | 25 | 19 | 30 | 30 | 27 | 23 |
| −20° C. | 28 | 25 | 28 | 22 | 15 | 27 | 27 | 23 | 20 |
| Appearance | ◯ | ◯ | ◯ | ◯ | ◯ | ◯ | ◯ | ◯ | ◯ |

Note:
(a): γ-Glycidoxypropyltrimethoxysilane ("KBM 403" produced by Shin-Etsu Chemical Co., Ltd.)
(b): γ-Glycidoxypropylmethyldiethoxysilane ("KBE 402" produced by Shin-Etsu Chemical Co., Ltd.)
(c): β-3,4-Epoxycyclohexyl)ethyltrimethoxysilane ("KBM 303" produced by Shin-Etsu Chemical Co., Ltd.)
CF: Carbon fiber
GF: Glass fiber

TABLE 5

| Comparative Example No. | | 11 | 12 | 13 | 14 | 15 | 16 | 17 | 18 | 19 | 20 |
|---|---|---|---|---|---|---|---|---|---|---|---|
| Graft copolymer (B) | Kind | | S-1 | | PDMS-1 | | | | | Ethylene/glycidyl methacrylate copolymer, 20 | S-8 |
| | Amount (part) | — | 20 | — | 20 | — | — | — | — | | 20 |
| Polyester | Kind | PBT | PBT | PBT | PBT | PBT | PBT | PET | PCT | PBT | PBT |
| | Amount (part) | 100 | 80 | 100 | 100 | 100 | 100 | 100 | 100 | 80 | 80 |
| Organic silane compound | Kind | | | (a) | (a) | | | | | | (a) |
| | Amount (part) | — | — | 1 | 1 | — | — | — | — | — | 1 |
| Filler | Kind | GF | GF | GF | GF | CF | Talc | GF | GF | GF | GF |
| | Amount (part) | 43 | 43 | 43 | 43 | 43 | 43 | 43 | 43 | 43 | 43 |
| Izod impact strength (⅛" in thickness, notched) (kg · cm/cm) | | | | | | | | | | | |
| 23° C. | | 8 | 12 | 8 | 20 | 5 | 4 | 7 | 7 | 26 | 20 |
| −20° C. | | 6 | 9 | 6 | 18 | 3 | 3 | 5 | 5 | 17 | 14 |
| Appearance | | ◯ | ◯ | x | ◯ | ◯ | ◯ | ◯ | ◯ | ◯ | ◯ |

Note:
(a): γ-Glycidoxypropyltrimethoxysilane ("KBM 403" produced by Shin-Etsu Chemical Co., Ltd.)
CF: Carbon fiber
GF: Glass fiber

What is claimed is:

1. A polyester resin composition obtained by blending
   60 to 99 parts by weight of a thermoplastic polyester resin (component A),
   1 to 40 parts by weight of a polyorganosiloxane graft copolymer (component B) of 0.08 to 0.6 μm in average particle size obtained by graft-polymerizing one or more kinds of vinyl monomer onto a compound rubber having such a structure that 1 to 99 wt. % of a polyorganosiloxane rubber component and 99 to 1 wt. % of a polyalkyl (meth)acrylate rubber component, the total amount of both the rubber components being 100 wt. %, have been inseparably entangled with each other, the total amount of the components A and B being 100 parts by weight, and
   0.01 to 10 parts by weight of an organic silane compound having an epoxy group (component C).

2. A polyester resin composition obtained by adding a reinforcing filler to the polyester resin composition according to claim 1, the amount of the former being 10 to 300 wt. % of the latter.

3. A polyester resin composition according to claim 1 or 2, wherein the polyorganosiloxane graft copolymer (B) is a polyorganosiloxane graft copolymer of 0.08 to 0.6 μm in average particle size obtained by graft-polymerizing a vinyl monomer onto a compound rubber obtained by polymerizing alkyl (meth)acrylate, a crosslinking agent and a graft-linking agent in the presence of a Polyorganosiloxane rubber obtained by emulsion-polymerizing organosiloxane, a crosslinking agent and if necessary a graft-linking agent.

4. A polyester resin composition according to claim 1 or 2, wherein the vinyl monomer is a (meth)acrylic acid ester.

5. A polyester resin composition according to claim 1 or 2, wherein the thermoplastic polyester resin (A) is one or more members selected from the group consisting of polybutylene terephthalate, polyethylene terephthalate and polycyclohexyldimethylene terephthalate.

6. A polyester resin composition according to claim 1 or 2, wherein the organic silane compound having an epoxy group is at least one member selected from the group consisting of γ-glycidoxypropyltrimethoxysilane, γ-glycidoxypropylmethyldiethoxysilane and β-(3,4-epoxycyclohexyl)ethyltrimethoxysilane.

7. A polyester resin composition according to claim 2, wherein the reinforcing filler is a glass fiber or carbon fiber.

* * * * *